(12) United States Patent
Haustein et al.

(10) Patent No.: US 7,366,520 B2
(45) Date of Patent: Apr. 29, 2008

(54) ADAPTIVE SIGNAL PROCESSING METHOD IN A MIMO-SYSTEM

(75) Inventors: Thomas Haustein, Berlin (DE); Eduard Jorswieck, Berlin (DE); Volker Jungnickel, Berlin (DE); Udo Krueger, Berlin (DE); Volker Pohl, Berlin (DE); Clemens v. Helmolt, Berlin (DE); Gerhard Wunder, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 441 days.

(21) Appl. No.: 10/483,012

(22) PCT Filed: Jul. 3, 2002

(86) PCT No.: PCT/DE02/02494

§ 371 (c)(1),
(2), (4) Date: Jan. 5, 2004

(87) PCT Pub. No.: WO03/005606

PCT Pub. Date: Jan. 16, 2003

(65) Prior Publication Data

US 2004/0171385 A1      Sep. 2, 2004

(30) Foreign Application Priority Data

Jul. 3, 2001    (DE) ................. 10132 492

(51) Int. Cl.
*H04Q 7/20* (2006.01)
(52) U.S. Cl. .................. 455/450; 455/1; 375/347
(58) Field of Classification Search ........... 375/267, 375/347, 219, 299, 259; 455/450, 101
See application file for complete search history.

(56) References Cited

U.S. PATENT DOCUMENTS

| | | | |
|---|---|---|---|
| 6,771,706 B2* | 8/2004 | Ling et al. | 375/267 |
| 7,062,294 B1* | 6/2006 | Rogard et al. | 455/562.1 |
| 2003/0031264 A1* | 2/2003 | Barry et al. | 375/259 |
| 2006/0146725 A1* | 7/2006 | Li et al. | 370/252 |

OTHER PUBLICATIONS

V.Jungnickel et al., "A Radio System With Multi-Element Antennas", Proceedings 53rd IEEE Vehicular Technology Conference VTC(Spring), May 6-9, 2001, Rhodos, Greece. (please pp. 167-170).*

(Continued)

*Primary Examiner*—David C. Payne
*Assistant Examiner*—Leon Flores
(74) *Attorney, Agent, or Firm*—Staas & Halsey LLP

(57) ABSTRACT

The invention relates to a signal processing method which optimizes the bit error rate under pragmatic conditions. The signalling method is optimally matched to the radio channel, variable with time, in rapid sequence by means of linear operations. Uplink and downlink transmission sides are determined by an excess of antennae on the downlink transmission side. The estimations of the channel matrix in the one transmission direction, necessary for the matching of the transmitter, can, in the absence of common-channel distortions with the condition of channel reciprocity, be directly obtained from the estimations for the other transmission direction. By a suitable linear combination of the transmission signals and, optionally, also the received signals, an error-free bi-directional transmission of data streams can be achieved in Rayleigh and Rice channels with significantly lower transmission powers than in purely receiver-side linear signal processing.

12 Claims, 9 Drawing Sheets

OTHER PUBLICATIONS

John R. Barry, Joon Hyun Sung, "Space-Time Processing with Channel Knowledge in Array-to-Array Communications", School of Electrical and Computer Engineering, Georgia Institute of Technology, Atlanta, Georgia, Jun. 9, 2000, Appendix C.*

John R. Barry et al., "A Simple and Adaptive Channel Diagonalizer for Optimal Space-Time Processing", School of ECE, Georgia Institute of Technology, May 1, 2000.*

* cited by examiner (i) n = m = 10, Rx signal processing only (ii) n = 8, m = 12, Rx signal processing only (iii) n = 8, m = 12, V-BLAST (iv) n = 8, m =12, Tx signal processing only (downlink channel inversion)

(v) n = m = 1, AWGN channel (vi) n = 8, m =12, Tx and Rx signal processing (uplink channel inversion)

ADAPTIVE SIGNAL PROCESSING METHOD IN A MIMO-SYSTEM

BACKGROUND OF THE INVENTION

1. Field of the Invention

The invention relates to an adaptive signal processing method for bidirectional radio transmissions of digital data streams in uplink and downlink transmission directions over a MIMO-channel with n antennae at one side of the channel and m antennae at the other side of the channel and with signal preprocessing of the transmission signals x at the transmission side and signal post processing of received signals y at the receiver both of which are based upon an estimate of the complex-valued channel matrix, and to a MIMO-system with at least one uplink transmission station with n antennae, a downlink transmission station with m antennae, as well as to a signal processing unit at least in the station provided with m antennae for executing the adaptive signal processing method.

2. The Prior Art

Mobile communications systems are expected in narrow frequency bands and at low transmission power to transmit at as low an error rate as possible, data of a high bit rate. This ideal is opposed by the arbitrary nature of the radio channel the amplitude and phase Gang of which change significantly in time, locale and as a function of carrier frequency (fading). Statistically, radio channels can be modulated by a Rayleigh (without visual connection) or Rice distribution (with visual connection). The invention relates to an adaptive transmission method on the basis of multi-element antennae at a mobile station at one and a base station on the other channel side between which bidirectional radio operation is taking place so that both sides may act as transmitter and receiver. Such "multiple-input-multiple-output" (MIMO) systems are being increasingly investigated on a worldwide basis because with them the quantity of data which can be transmitted per 1 Hz of bandwidth ("spectral efficiency") can be significantly increased. This is achieved by the simultaneous transmission of several data streams in the same frequency band (same channel operation).

MIMO-systems have assumed an important role in radio transmission ever since Foschini demonstrated that with them the spectral efficiency, i.e. the use of the scarce resource "bandwidth" can be significantly improved [1]. In a MIMO-system several digital data streams are simultaneously transmitted at the same frequency by several transmission antennae (transmission vector x). The several receiving antennae (receiving vector y) test the resulting field distribution at several localities, i.e. there is always a different superposition of the transmission signals. This may be described by a vectorial equation $$y = H \cdot x + n \quad (1).$$

H represents the so-called "channel matrix" in which the values of amplitude and phase of the individual channels are listed between every possible pair of transmission and receiving antennae (data signal paths). Vector n describes the noise at the individual receiving antennae. At the receiving side, the transmitted data signals can be separated again from each other by appropriate signal processing. In order to separate the data signals at the receiving side, knowledge of the channel matrix H is necessary. The knowledge may in practice be obtained by a repeated estimate of the channel matrix H, made in advance and at regular intervals, on the basis of reference signals [1].

In very simple MIMO-systems of the prior art, a special pseudo inverse $H^{-1}$ of H (for instance the Moore-Penrose-pseudo inverse) is initially calculated from the knowledge of a channel matrix of dimension n×m and the individual listings $h_{ij}$ in the channel matrix (each listing being a complex number describing the transmission in the radio channel from the $j^{th}$ transmission antenna to the $i^{th}$ receiving antenna), followed by a multiplication therewith of the receiving vector (so-called "zero-forcing") for reconstruction of the transmitted data signals (reconstructed data signals marked by an apostrophe). Thus:

$$x' = H^{-1} \cdot y = x + H^{-1} \cdot n \quad (2).$$

In this purely receiving-side signal processing, the term $(H_{-1} \cdot n)$ is problematic. Because of it, during decorrelation of the transmitted signals in accordance with equation (2), the noise in the individual data signal paths is also amplified as a function of the channel. Consequently, the transmission power required for an error-free decoding of all data signals is relatively high.

A marked improvement was brought about by the work of Golden, Foschini et al. 1999, proposing recursive signal processing at the receiver (Bell Labs Layered Space-Time, "BLAST" or "V-BLAST" [2]. In accordance with it, the strongest received signal is initially selected and decoded. Prior to detection of the next strongest signal, the signal which has already been received is subtracted from the receiving signals of all antennae. In this manner, the effective number of transmitters in the system is reduced, i.e., progressively fewer transmitters must be detected with the same number of receiving antennae which reduces the probability of errors in the detection of the remaining data streams. To this end, the corresponding column in the channel matrix is eliminated and a modified pseudo inverse $H_1^{-1}$ is calculate. The norm of the line vectors in the matrices $H_1^{-1}$ (I=1 . . . n) is reduced by the surplus of receiving antennae as they increase step by step. In this manner, the noise variance becomes smaller, and the error rate in the detection of the remaining data signals is lower. Overall, the bit error rate is significantly improved by the BLAST method. Several variations of the recursive signal processing method exist (e. turbo-BLAST [3] or BLAST in combination with MMSE-detection [4]). Their weak points reside in the time-consuming recursive processing of the signals which renders any real-time transmission at high data rates difficult, as well as in the non-linear decisions executed within the recursion which in case of an error may lead to further erroneous decisions in subsequently detected data streams. This error progression occurs in many non-linear detection algorithms, e.g. in the so-called "decision feedback equalizer" (DFE). While the BLAST method may thus reduce the effect of the term $(H^{-1} \cdot n)$ of equation (2), it cannot eliminate it.

In principle, it has been known that it is possible to improve the efficiency of the system by signal processing at the transmission side. For instance, in the paper by Teletar, 1999 [5] a condition is reported of how knowledge of the channel allows maximization of the capacity at the transmission side. The method is called "water filling method". However, for optimizing the theoretical information capacity no direct reference is made in the report in respect of the modulation process to be employed and the number of the actually used individual channels. In the water filling method, bad channels are switched off because of the advantage of transmitting their data signals at a higher data rate over the remaining channels. In this connection, the transmission power is distributed over the remaining channels such that in all channels the sum of transmission and noise power is equal to a constant which may figuratively be interpreted as "water filling". However, tests have shown that the water filling method yields a noticeable increase in capacity only at a low signal-to-noise-ratio. It does, however, require a comparatively high flexibility and complexity in its transmission system in view of the fact that the signal-to-noise-ratio in individual channels differs. Accordingly, a correspondingly adjusted modulation and coding process is required in each individual channel. Telatar's theoretical work proposes this approach for improving the capacity of a MIMO-system. For evaluating communications systems, the information theory utilizes the capacity as a measure for the highest possible quantity of data which can be transmitted at a low error rate in a bandwidth of 1 Hz. However, when considering capacity, marginal technical conditions such as, for example, data rates, modulation methods and channel coding are ignored. From Shannon's deduction it becomes apparent that the ultimate capacity can only be achieved at a redundance in the system approaching infinity which is equal to an infinitely high technical complexity. However, this renders the efficiency of applying this system in practice very small. Hence, in practical applications it is usually the bit error rate which is used for systems evaluation where the technical parameters mentioned above are recorded. Transmission processes are then selected which in respect of capacity are always sub-optimal but which are optimal in respect of the efficiency of a practical application. As a rule, such processes are of very simple structure or they make use of certain conditions in the transmission channel in order markedly to reduce the technical complexity.

The above-described "zero forcing", "V-BLAST" and "water filling" processes are intended for so-called "flat MIMO-channels". A channel may be considered to be "flat" if the complex valued channel coefficient changes but little as a function of the frequency in the transmission band. This is only the case in narrow-banded transmission systems where the propagation scattering of the transmission signals between transmitter and receiver are smaller than the symbol duration. Otherwise, the channel is frequency-selective, and a chronological regeneration of the signals is additionally required. In the paper by Wong et al., 2000 [6] the common space-time regeneration for a MIMO-system in frequency-selective channels is investigated. The data to be transmitted are multiplied by a transmission matrix T and the data to be received are multiplied by a receiving matrix R. A conventional signal model is being used in which the folding of the transmission signal otherwise necessary is reformulated with the matrix channel pulse response as multiplication by a Toeplitz-matrix. In the paper, that structure of the R and T matrices is deduced which minimizes the signal-to-interference-and-noise-ratio at the detector (minimum means square error solution, MMSE). Thereafter, the complete solution is reduced for the frequency-selective channel for the case of a flat channel. It is not clear, however, how, in an actual systems approach, the transmitter can obtain knowledge about the channel coefficients. In frequency-selective channels the number of channel parameters to be estimated increases by a the factor of the memory length of the channel. When looking at a MIMO-system, for instance, of 8 transmitters and 12 receivers at a memory length of the channel of 10 symbols, the transmitter has to know 8×12×10=960 complex parameters to carry out the operations at the transmitter described by Wong et al. Since the channel may change in time, these parameters must be retransmitted from the receiver to the transmitter within the very short coherence time of the channel (e.g. 5 ms). At a resolution of 8 bits for the real and imaginary component of each channel coefficient, a bandwidth of 2*960*8 bit/5 ms≈3 Mbit/s is required in the return channel for only the return transmission of the channel information. This does not appear to be practicable. It remains open, furthermore, whether the method described by Wong et al. is suitable for any antenna configurations, and which requirements exist as regards the exactness of the channel estimation.

OBJECTS OF THE INVENTION

Proceeding from the state of the art known from Foschini [1,2], the point of gravity of the present invention, particularly relative to Telatar [5], resides in achieving as high an efficiency of realization in practical applications, i.e. in the lowest possible technical complexity. The complex of the tasks of the present invention is, therefore, so further to develop the known adaptive signal processing system of the kind mentioned supra in a MIMO-system that the bit error rate is optimized by reducing it significantly. The method in accordance with the invention will demonstrate a basic systems solution. At the same time, the method in accordance with the invention is to require low transmission power and make real-time transmissions possible. In the practice of a concrete MIMO-system simple and, therefore, easily operable and cost-efficient realization possibilities are to be provided on the basis of the efficiency achieved by the improved method.

SUMMARY OF THE INVENTION

The accomplishment of this complex of tasks is basically characterized in the present invention by the characterizing elements of the main claim for an adaptive signal processing method in a MIMO-channel of the kind under consideration and by the characterizing elements of the auxiliary claim for a MIMO-system of the kind under consideration for the advantageous practice of the method in accordance with the invention. Preferred embodiments of the invention may be gleaned from the respective sub-claims.

The adaptive signal processing method in accordance with the invention is completely free of redundancy and feed-back. It does not operate on the principle of recursive error compensation but prevents in advance any occurrence of errors. The method is characterized by a continuous linear processing of signals, especially in an uplink transmission direction, with very low signal processing complexity. In the absence of common-channel interference, the signal-to-noise-power ratio in all individual channels of the MIMO transmission channel is rendered equally large by signal preprocessing at the transmitter. In this manner, a transmission of uniform quality is obtained for all channels by a number of individual channels determined in advance. Hence, the same symbol rate may be used in all channels, and the same modulation process may be applied. Relative to known systems, the provision of signal processing at the transmitter constitutes no substantial added complexity in its technical realization. At the same time, the complexity at the receiver is significantly reduced as there are no complex recursion calculations in connection with feed-back lines. Overall, therefore, the requirements for hardware and software is lower than it is in known BLAST methods. This is the case in any event in the method in accordance with [5] with its complexity approaching infinity. The deliberately linearly designed structure of the channel inversion in the signal processing method in accordance with the invention allows an operation of a constant high data signal rate transmission in real-time. Moreover, under the conditions set forth in the main claim, the quality of the MIMO transmission at the receiver is also improved. It may, however, require a somewhat higher transmission power. The bit error rate is minimized for a selection of marginal conditions (set number of individual channels, same symbol rate for all individual channels, freely selectable modulation process) motivated by their practical realizability. The practical realization is simplified.

Good transmission properties are achieved by the present invention for a novel wireless communications system, and the efficiency of its practical realization is in an optimum range, in view of the relatively low complexity. Under the conditions mentioned, the data signals to be transmitted can be optimally coupled into the wireless transmission channel. The noise characteristics at the receiver remain largely unaffected by the signal reconstruction, and even at a low transmission power relatively low bit error rates are achieved, which otherwise is only possible in a cable-bound transmission or in directional wireless transmission with visual connection. The MIMO-system for practicing the signal processing method in accordance with the invention is operational without visual connection. The proposed signal processing at the transmitter and receiver is of a linear algebraic structure which makes possible a simple implementation in real-time, even at high data rates. In the signal processing method in accordance with the invention the bit error rate is optimized at a variable modulation, which is the same for all individual channels, and at a preset total transmission power. The number of individual channels is also maintained constant. Analogously to the designation of single-channel systems, in the signal processing method in accordance with the invention reference may hereafter be had to "channel inversion" in the uplink and downlink direction.

Under the conditions set forth in the main claim, and in contrast to the method known from [5], a clear operating direction which can easily be put to practice is set forth, of how to distribute the data signals to be transmitted to the individual antennae and of which linear combination is additionally needed for the receiving signals to ensure a reliable transmission at a low bit error rate. The adaptive signal processing method in accordance with the invention is based upon a linear dissection of the channel matrix. Different methods of linearly dissecting matrices are generally known from mathematics, and they are well established. An especially preferred linear dissection which will hereafter be explained in greater detail is based upon the so-called "singular value dissection" of the channel matrix of $$H = U \cdot D \cdot V^H \quad (3)$$

where U is a (m×n) matrix and V is a (n×n) matrix with orthogonal column vectors. D is a (n×n) diagonal matrix with the singular values of the channel matrix H positioned in the diagonal. The singular values are the roots of the inherent value of the channel matrix H. The number of inherent values corresponds to the number of the parallel (virtual) individual channels in the MIMO-channel. The size of the inherent values is a measure of the power transmission in an individual channel. Since in the signal processing method in accordance with the invention the number of antennae on the two sides of the channel are selected to be different (n<m), the maximum number of parallel individual channels corresponds to that Rang of the channel matrix which is given by the smaller number. In the Raleigh and Rice matrices H commonly used in wireless transmissions, the singular values are distributed continuously over a broad band, i.e. within predetermined limits there are small and large singular values.

Insertion of the linear dissection in accordance with equation (3) into the general transmission equation (1) and initial ignoring of the noise, results in $$y = U \cdot D \cdot V^H \cdot x \quad (1a)$$

The thus prescribed mathematical operations at the signal vector x are executed from the right to the left and will hereafter be explained in greater detail. As a first step, the signal vector x is multiplied by the matrix $V^H$. This corresponds to a rotation or a projection in the directions of the parallel (virtual) individual channels. It results in every data signal transmitted by an antenna being distributed onto all parallel individual channels. The signal mix projected onto each individual channel will be extended by the value of the associated singular value by the following multiplication by the diagonal matrix D. The multiplication by the matrix U which is not square because of the unevenness of the number of antennae at the two sides of the channel (n<m), results in an image into the space of the receiving antennae. The previously extended signals of the n vertical individual channels are thus projected onto m orthogonal vectors in the space of the receiving antennae. Thus, the n data streams which were coupled into n parallel individual channels with transmission properties of different quality, will be mixed onto m receiving antennae.

The special pseudo inverse $H^{-1}$ used in equation (2), which preferably may be the Moore-Penrose-pseudo inverse, may be calculated by singular value dissection as $$H^{-1} = V \cdot D^{-1} \cdot U^H \quad (4)$$

By equation (3) it will be recognized that $H^{-1} \cdot H$ provides the uniform matrix. The diagonal matrix $D^{-1}$ received the inverse singular values which like the singular values themselves are distributed over a broad band. It can also be seen that the smallest singular value in particular which occasionally may be close to zero, has a decisive effect on the noise remaining in equation (2) and correspondingly raised by multiplication by the inverse singular values, after the reconstruction of the transmitted data signals. The singular value dissection is capable of real-time, i.e. even for larger channel matrices H it can be calculated by modern microprocessors within a time which is short by comparison with the temporal changes of the channel.

In the uplink direction the data signals x to be transmitted are modified prior to transmission by $$x^* = V \cdot D^{-1} \cdot V^H \cdot x \quad (5)$$

or alternatively $$x^* = V \cdot D^{-1} \cdot x \quad (5a)$$

(modified data signals designated by an asterisk *). The two kinds of channel inversion in the uplink path in accordance with equations (5) and (5a) differ from each other by the way in which the data are distributed on the main axes in the transmission space. In the first case, the channel is inverted but the data stream is transferred to all main axes in the signal space. In the second case, every data stream is transformed and transmitted to a main axis in the signal space. From the signaling, no difference can be perceived in the performance of the two variants, but it is to be assumed that the first variant is somewhat more robust in respect of channel estimation errors because the data are spread over all main axes.

Each transmission antenna thus transmits a different linear combination of the data signals x into the MIMO transmission channel, i.e. the transmission vector x in equation (1) replaced by the modified transmission vector x* of equation (5). The following remarks serve to explain the signal preprocessing in the uplink transmission direction at the transmitter. The signal preprocessing ensures that a data signal stream is now transmitted over all n antennae in such a way that it is positioned precisely in the direction of projection of an individual channel. This approach is the same for all parallel individual channels. Each data stream now experiences the extension by the inverse value of the singular value belonging to the individual channel, i.e. without signal preprocessing, all data signal streams would be transmitted in a different qualitative state. In order to equalize this, the data signal streams in a good individual channel are transmitted with lower power, and the save power is added to the data signal stream in a worse individual channel. This is achieved in an optimum manner by multiplication by the inverse diagonal matrix $D^{-1}$. It affects an approximation of the power of the data signal streams in all parallel individual channels behind the extension by the diagonal matrix D. The same is true of the downlink transmission direction which will be explained in greater detail in the second following paragraph. Here, the predistortion with a pseudo inverse of the transposed channel matrix, and n data signals are coupled into n parallel individual channels by m antennae. Since in the uplink transmission direction there are only n receiving antennae, signal preprocessing may take place such that the outputs of the individual channels are directly associated with the individual antennae. A channel separation at the receiver side is thus unnecessary.

Proceeding from equation (5), the received signals y, for the reconstruction of the data signals, need to be further processed at the receiver as follows (received signals marked by an apostrophe '):

$$x' = V \cdot U^H y \qquad (6)$$
$$= V \cdot U^H \cdot (H \cdot x^* + n)$$
$$= V \cdot U^H \cdot) U \cdot D \cdot V^H \cdot V \cdot D^{-1} \cdot V^H \cdot x + n)$$
$$= x + V \cdot U^H \cdot n)$$

or alternatively $$x' = U^H \cdot y \qquad (6a)$$
$$= U^H \cdot (H \cdot x^* + n)$$
$$= U^H \cdot (U \cdot D \cdot V^H \cdot V \cdot D^{-1} \cdot x + n)$$
$$= x + U^H \cdot n$$

In the line above equation (6) or (6a)) it will be seen that all the many matrices in the end yield a uniform matrix. It is much more interesting, however, that the remaining term of the noise is clearly different from the result without signal processing at the transmitter according to equation (2). In contrast to $H^+$ the matrices V and $U^H$ do not change the isotropic character of the noise, i.e. the effect of the singular value dissection on noise is completely eliminated by equations (5) and (6). Thus, the bit error rate, quite similar to the additive channel with white noise depends only on the signal-to-noise-power ratio at the receiver and no longer upon the channel properties. For an error-free data transmission in the MIMO-channel, i.e. for the bit error probability less than $10^{-9}$ required in the real-time application, by the adaptive signal processing method in accordance with the invention, the required mean transmission power is substantially lower than in the known signal processing method ("zero forcing") according to equation (2).

The transmission power increases because of the signal processing at the transmitter in uplink and downlink path by a factor n/(n-m). This invokes equation (6) or (6a), i.e. without noise the channel is transparent (x'=x). In the uplink path the noise is additionally multiplied by the matrices V and UH. This results in a reduction of the dimension of the isotropically distributed accidental noise vector from m to n, i.e. on average the vector becomes shorter. If instead of the receiving power as described above, the transmission power is used as the evaluation criterion for the signal processing method, the bit error rate of the channel inversion in the uplink direction, with the same number of antennae, approximately comparable to the bit error rate of the known V-BLAST method (see FIG. 8). For this, only one linear matrix-vector-multiplication is required for the channel inversion at each of the transmitter and the receiver, whereas the V-BLAST method must perform several successive matrix-vector-multiplications at the receiver. On the other hand, noticeably longer pilot sequences are required for the channel inversion than for the V-BLAST method. This appears to practicable only for higher data rates.

The conditions in the adaptive signal processing method in accordance with the invention are simpler yet in the downlink transmission direction. Here, the transmission signal is merely multiplied by a right-sides pseudo inversion of the channel matrix. If the channel estimation in the downlink transmission direction and the data transmission in the downlink transmission direction operate at the same frequency, and the channel matrix in the uplink direction is H, the $H^T$ is the channel matrix in the downlink direction, i.e. in equation (1) H is replaced by the channel matrix $H^T$. This follows from the assumption of the so-called "reciprocity" of the transmission channel. If an arbitrary pair is formed from one antenna of each of the sides of the MIMO-channel, the associated uplink and downlink transmission path in one time window have the same channel properties as long as no temporal change has occurred. A possible right-side inverse may be found with the aid of $(H^{-1})^T$, the transposed Moore-Penrose-pseudo inverse. The latter minimizes the mean transmission power in the case of Rayleigh fading. The transmission data are, therefore, multiplied by $(H^{-1})^T$ $$x^* = (H^{-1})^T \cdot x \qquad (7)$$

i.e. in equation (1) s is replaced by s* according to equation (7). In the following equation (8) it can be seen that the originally transmitted data signals are thereby complete reconstructed at the receiver:

$$x' = H^T \cdot x^* + n \qquad (8)$$
$$= H^T \cdot (H^{-1})^T \cdot x + n$$
$$= x + n$$
$$= y$$

In addition to he transmitted data signals there is the inherent noise of the individual antenna branches and amplifiers at the receiver. The same bit error rate may be assumed at the receiver as at the channel with white noise. Especially by signal processing according to equations (7) and (8) and even at a comparatively very low transmission power, an almost error-free data transmission is possible with the adaptive signal processing method of the invention.

The concept of signal processing in accordance with the present invention may be very easily put to practice, for the data signal vector in the uplink transmission direction requires multiplication by just one matrix at the transmitter and at the receiver. In the downstream transmission direction the data signal vector is multiplied by one matrix only at the transmitter. This involves a linear algebraic operation which can be realized much more easily than the recursive signal processing at the transmitter in the known BLAST method in which a number of non-linear decisions are made which suffer from the characteristic of error propagation. The linear signal processing method in accordance with the invention is suited substantially better for real-time transmission at high data signal rates. Moreover, at the same receiving power it is possible to realize markedly lower bit error rates.

In order to make use of these advantages, three essential conditions must be met all of which have already been tested with the air of simulators. Firstly, for reasons of the limited transmission power it is necessary to employ at least one antenna more at the transmission side than at the other side. However, the adding of further antennae in the downlink transmission station is more suitable in order further to reduce the transmitter dynamics. The second condition is the need for a relatively precise channel estimation. The spread of the estimation error should be smaller by a factor of 3 than in the known BLAST method. To achieve small bit error rates, sequences of a length of about 100 symbols may be applied in a possible realization of the channel estimation, for instance with orthogonal pilot sequences according to Jungnickel et al. [7]. This results in the third condition: The symbol rate which is derived from the data signal rate as a function of the selected modulation method, should, at no more than 20% of relative time spent for the channel estimation, be larger than 150 ksymbols/s. In interior spaces for instance, this requirement, depending on the channel characteristics, is easily met. In the BLAST-method a symbol rate of 30 kHz was used, and 20 symbols for the channel estimation and 80 data symbols were alternatingly transmitted. Consequently, a channel estimation for T=3.3 ms was valid. In the Doppler frequencies of no more than $f_D$=17 Hz to be expected in an indoor environment at a carrier frequency of 5 GHz and velocities of up to 1 m/s, there would result a change in phase of $\Delta\phi=2\pi f_D$=10° which is sufficiently small for the detection of data signals modulated at higher values (e.g. 16-QAM). However, at 100 symbols the entire transmission time for the channel estimation would be lost. If, however, a higher symbol rate is used than in BLAST, for instance in wireless local nets (WLAN) the duration of the time window is reduced and is lost for the channel estimation. At a symbol rate of 1 MHz for instance, 3,300 symbols are transmitted in 3.3 ms. A channel estimation of 100 symbols would thus require only about 3% of the entire available time. In the uplink transmission direction twice the time is required for the channel estimation since the channel must be known at both sides of the channel. Thus, the MIMO-channel inversion of the signal processing method in accordance with the invention can be usefully employed only at higher symbol rates above 100 ksymbols/s and especially more than 150 ksymbols/s.

DESCRIPTION OF THE SEVERAL DRAWINGS.

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

FIG. 1 depicts signal processing in the MIMO-channel in uplink and downlink transmission directions;

FIG. 2 shown a bidirectional MIMO-system with channel inversion;

DETAILED DESCRIPTION OF THE PREFERRED EMBODIMENT

Figure 1:
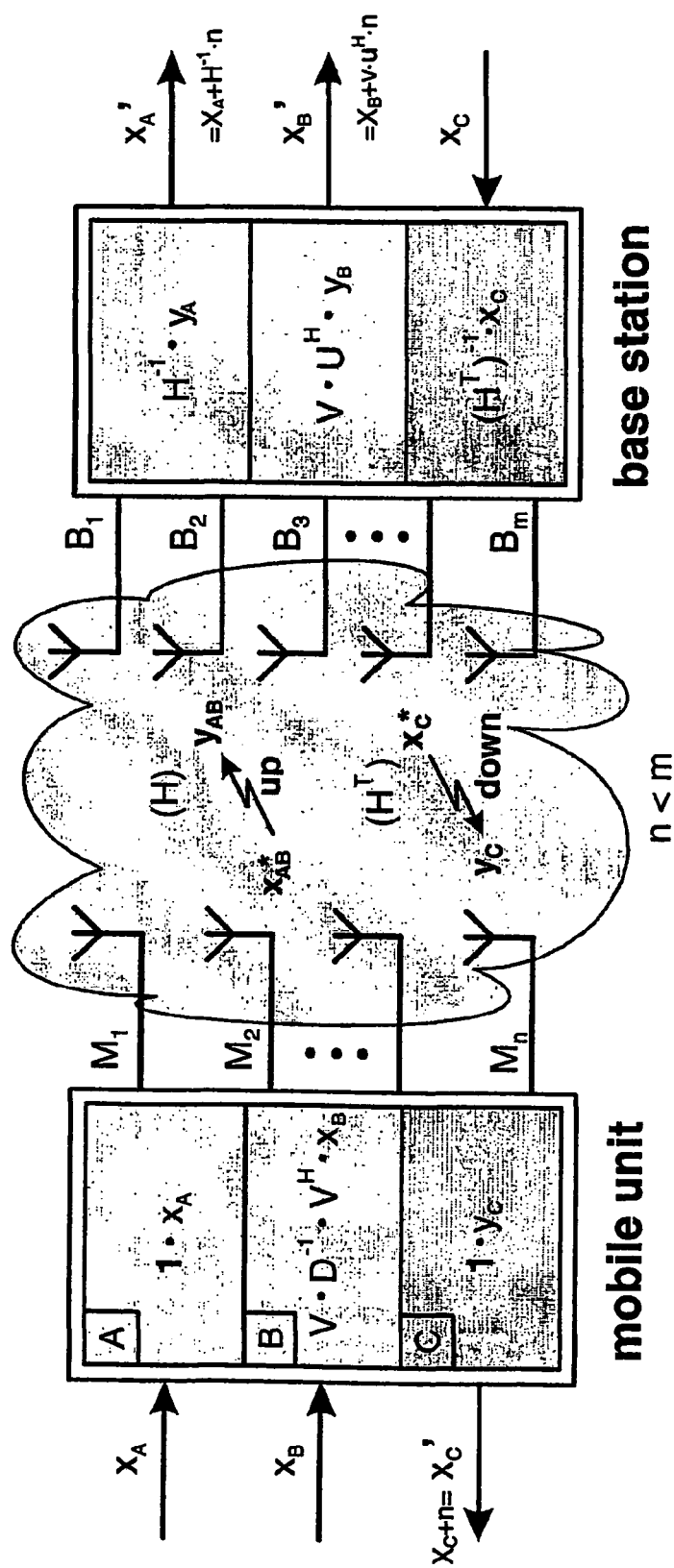

The different transmission schemes in a MIMO-channel are depicted in FIG. 1. Scheme A designates the simplest conceivable MIMO-system which is sufficient for receiving-side signal processing and which is known from the prior art (see [6], for instance). Schema B depicts the transmission side and receiving side signal pre and post processing in accordance with the invention at channel inversion in the uplink transmission direction, and scheme C shows the exclusively transmission side signal processing in accordance with the invention at channel inversion in the downlink transmission direction. In the MIMO-system shown the uplink transmission station is formed by a mobile station (mobile unit) with n antennae (1 . . . n) and the downlink transmission station is formed as a base station with m antenna (1 . . . m). n<m. The mathematical operations to be used on the transmission vectors x at the transmission side and on the receiving vectors y at the receiving side which have been explained in the general descriptive portion of the specification are associated to the corresponding stations. The modified transmission signals are labeled with an asterisk, the reconstructed data signals are labeled with an apostrophe, the uplink transmission direction with "up" and the downlink transmission with "down" (gray background).

Figure 2:
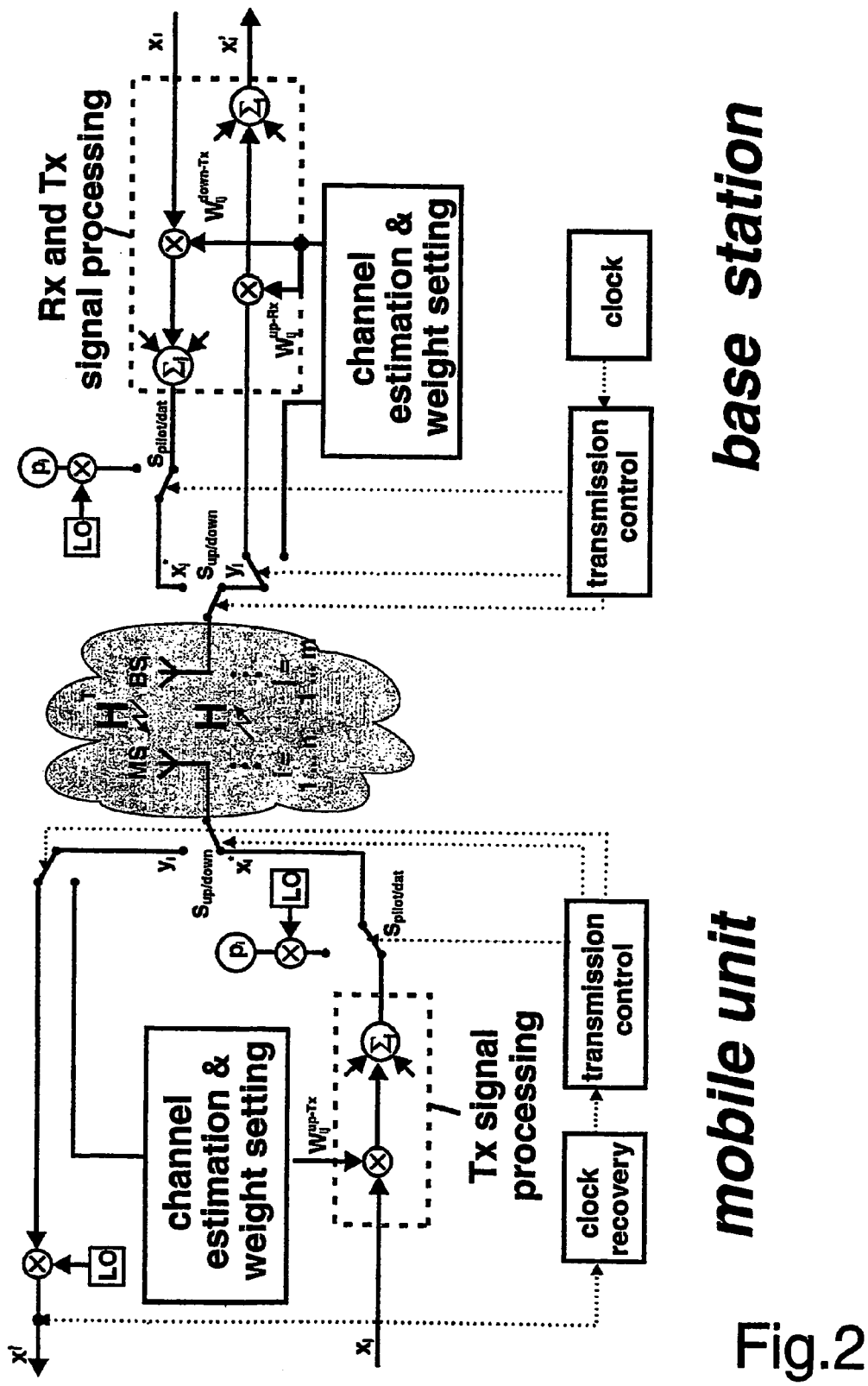

FIG. 2 depicts a synoptical circuit diagram of the MIMO transmission system of the invention according to scheme B with transmission side signal processing (Tx signal processing) and receiving side signal post processing (Rx signal processing). The uplink transmission station and the downlink transmission station have here been labeled, using the cellular mobile wireless scenario as an example, as "mobile unit" and "base station". Building upon an estimation of the channel with the transposed channel matrix $H^T$ in the downlink direction, the weights for the transmission side signal processing are calculated with the aid of the channel matrix H and equation (5) for channel estimating and weight setting in the mobile unit. They define how the individual data signals flow into the signal to be transmitted by an antenna. The weighted contributions are separately summed and result in the transmission signals x* which are simultaneously transmitted over the MIMO-channel. The following signal processing at the receiver is based upon an additional estimation of the channel matrix H in the uplink transmission direction. The weights are calculated by equation (6), and the individual data signals x' are also reconstructed, in the same manner as before at the transmitter, as linear combination of the received signals y. The data signals x to be transmitted in the downlink transmission direction are multiplied by the weights according to equation (7) which have been derived from an estimation of the channel matrix H in the uplink transmission direction. The trnsmission signals x* result from the respective sums. As shown in equation (8), no signal processing at the receiver is required in the downlink transmission direction. Consequently, the reconstructed data x' result directly from the base band signals y of the individual receivers.

For the channel estimation, similar to (7), every antenna is identified by its characteristic PN-sequence $p_i$ (pseudo noise) and preferably modulated onto the carrier by binary phase shift, and transmitted at certain times instead of the data signals with the aid of a fast analog switch $S_{Pilot/Data}$. The coupling in of the pilot signals after modulation and signal processing at the transmission side makes different modulation processes possible for the pilot and data signals.

Figure 3:
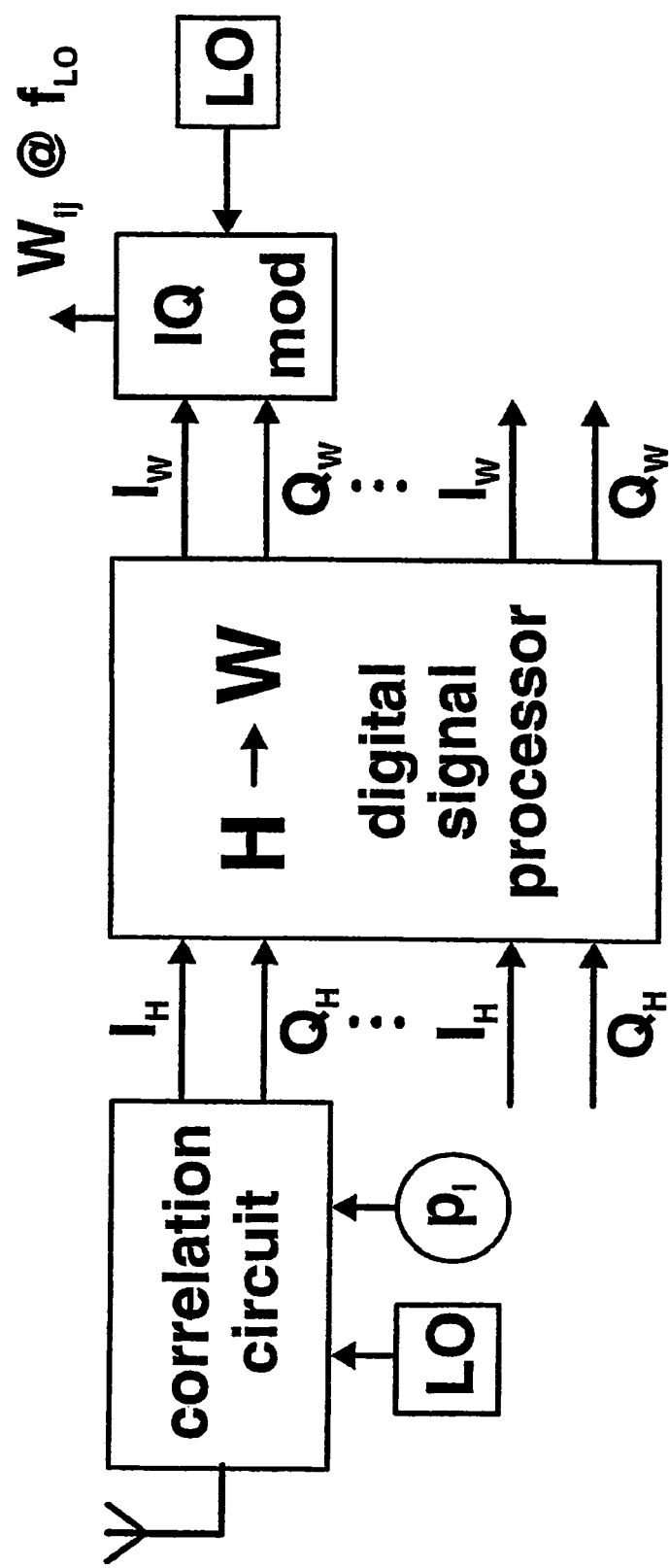
FIG. 3 depicts a possible channel estimation and weighting.

FIG. 3 shows the principle of the channel estimation and weighing unit. Initially, real component $I_H$ and imaginary component $Q_H$ of each individual input in the channel matrix H is estimated in a correlation unit. The analog data are then digitized and read into a digital signal processor. Here, the weight matrix W is calculated and issued in the form of its real component $I_W$ and its imaginary component $Q_W$. For analog signal processing, the weights would now have to be reconverted from digital to analog (which is not to exclude a purely digital further processing of the signals). During analog processing, the signals are fed to an IQ-modulator (IQ-Mod). It can change amplitude and phase of the local oscillator (LO) according to the corresponding weight. The LO serves here as a carrier of the weight information. With the aid of the LO signal changed in this manner, every individual received signal is individually converted into the base band. The further steps have already been described in connection with FIG. 2.

Figure 4:
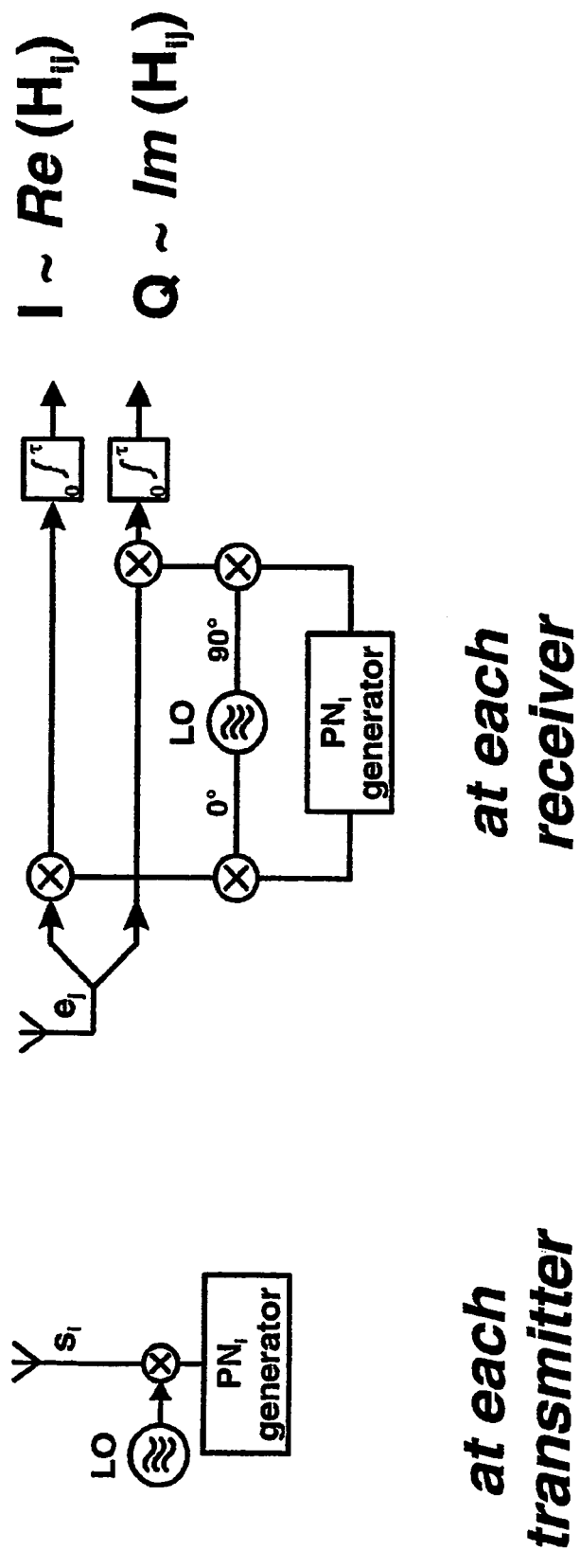
FIG. 4 depicts a correlation circuit with orthogonal sequences for the channel estimation according to FIG. 3.

FIG. 4 depicts the unit for estimating a complex-valued input in the channel matrix H. By way of example, only the realization in the transmission band will be explained here. A similar realization is also possible in the intermediate frequency or may be carried out directly in the base band by complex-valued multiplication. During an estimation all antennae simultaneously transmit sequences which are orthogonal relative to each other, on the basis of which they can be identified during channel estimation. Be it assumed, matrix element $H_{ij}$ is to be measured. For this purpose, the $j^{th}$ received signal $e_j$ is fed to a correlation circuit. A generator generates the same sequence by which the $i^{th}$ transmission antenna is identified and initially modulates it on the LO as well as on a copy of the LO phase shifted by 90°. These two reference signals are then multiplied by the received signal $e_j$, and the two results are integrated for the total duration of a sequence. It was shown in [7] that with this arrangement, real component $I_H$ and imaginary component $Q_H$ of the matrix element $H_{ij}$ can be measured independently of each other. Because of the orthogonality of the sequences, the simultaneously transmitted pilot signals of the other antennae do not interfere with the result of the estimation. The further steps have already been described in connection with FIG. 3.

In the MlMO-system according to the invention, the reciprocity of the wireless channel is utilized explicitly in order to avoid the return channel of U.S. Pat. No. 6,131,016 [8]. Reciprocity means that but for very rare exceptions the wireless channel in uplink and downlink directions is completely identical between an antenna at the mobile station and an antenna at the base station. By demonstrating that the received wireless signal consists of a number of echo signals which have traveled different paths it can be shown that amplitude response and phase response of each individual echo signal are identical, i.e. reciprocal, in both directions of transmission. From this the reciprocity of the entire signal can be deduced. In the absence of common-channel interference, the parameters from the channel estimation in the uplink transmission direction can be immediately reused for data transmission in the downlink transmission direction, and vice versa, provided the same carrier frequency is alternatingly used for both directions (time duplex transmission, TDD). In this manner, the channel coefficients may already be known a priori to the transmitter. By signal preprocessing at the transmission side, it may correspondingly adjust the signal power in each individual path.

In order to increase the robustness against common-channel interferences it is inevitable to resort to a solution in the return channel since the transmitter cannot possibly know a priori the interference situation at the receiver. The initial approach may be as described above, i.e. the reciprocity is used for maximizing the signal power in every individual channel. Thereafter, the interference power $P_{Stör}$ in each individual data signal path is measured at the receiver after spatial signal processing, and only information relating to the magnitude of the interference power in the individual data signal paths is returned to the transmitter by way of the return channel. In the above example, the data rate required for this purpose is smaller by a factor of 24 than in the return transmission of all parameters for the channel estimation. The power of data signals to be transmitted is then adjusted at the transmitter prior to their transmission-side signal processing (matrix multiplication) such that all received signals have the same signal-to-interference-plus-noise-power ratio (SINR) (power regulation in the individual channel).

Figure 5:
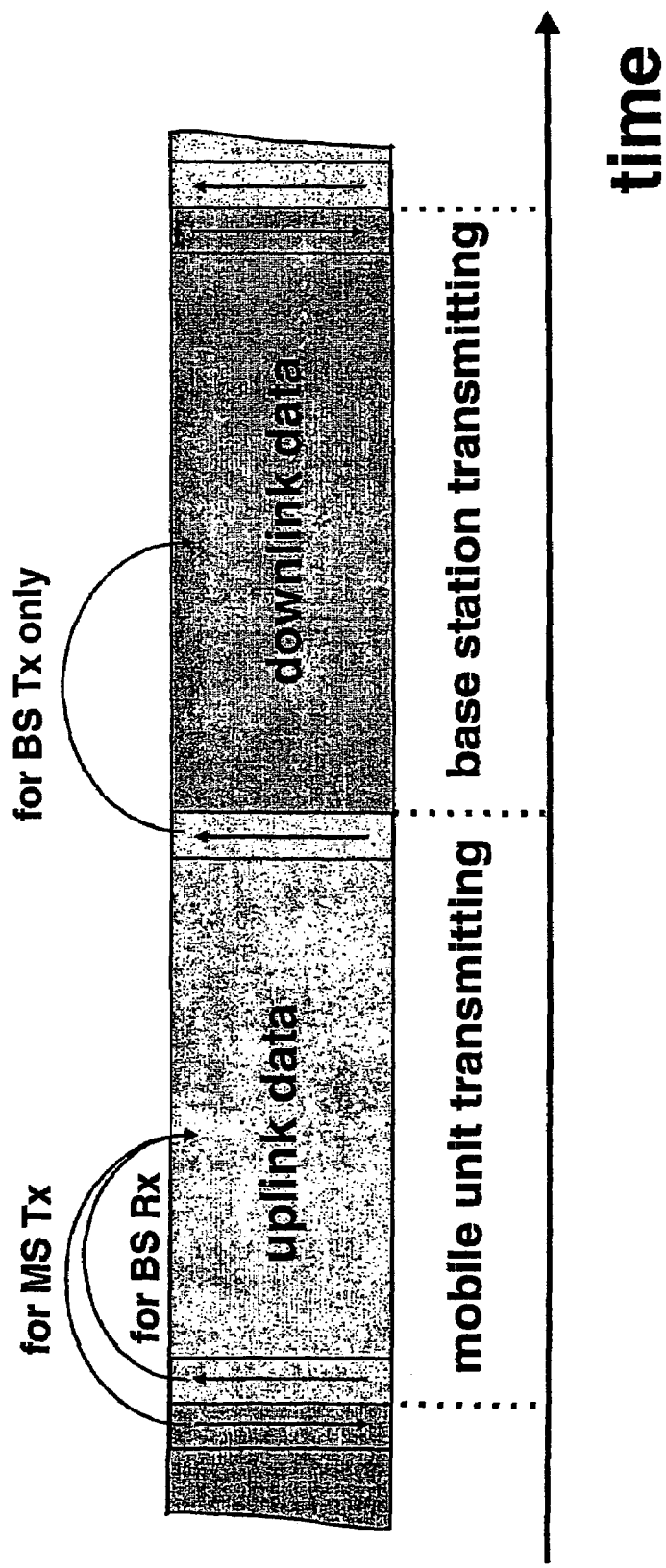
FIG. 5 depicts a MIMO-channel estimation in TTD mode.

The simplest explanation of the reuse of the channel estimation from the opposite direction can be explained in time duplex (TDD). Uplink and downlink transmission directions are sharing a carrier frequency and are operated at different times. FIG. 5 shows a possible time division realized by the transmission control and diverse analog switches according to FIG. 2. For the uplink transmission direction (uplink data) a channel estimation in mobile and basis station (MS, BS) is required. To this end, the base station intially transmits its pilot sequences (base station transmitting) so that the mobile station can set its transmission weights. Thereafter, the mobile station (mobile unit transmission) transmits its antenna sequences, and the base station sets its receiving weights. The connection is now properly tuned, and data can be transmitted. Before changing the transmission direction, the mobile station briefly transmits its antenna sequences again so that the base station can set its weights for the downlink transmission direction on the basis of an actual channel estimation. No knowledge of the channel is thus required in the mobile station as regards the downlink direction.

Figure 6:
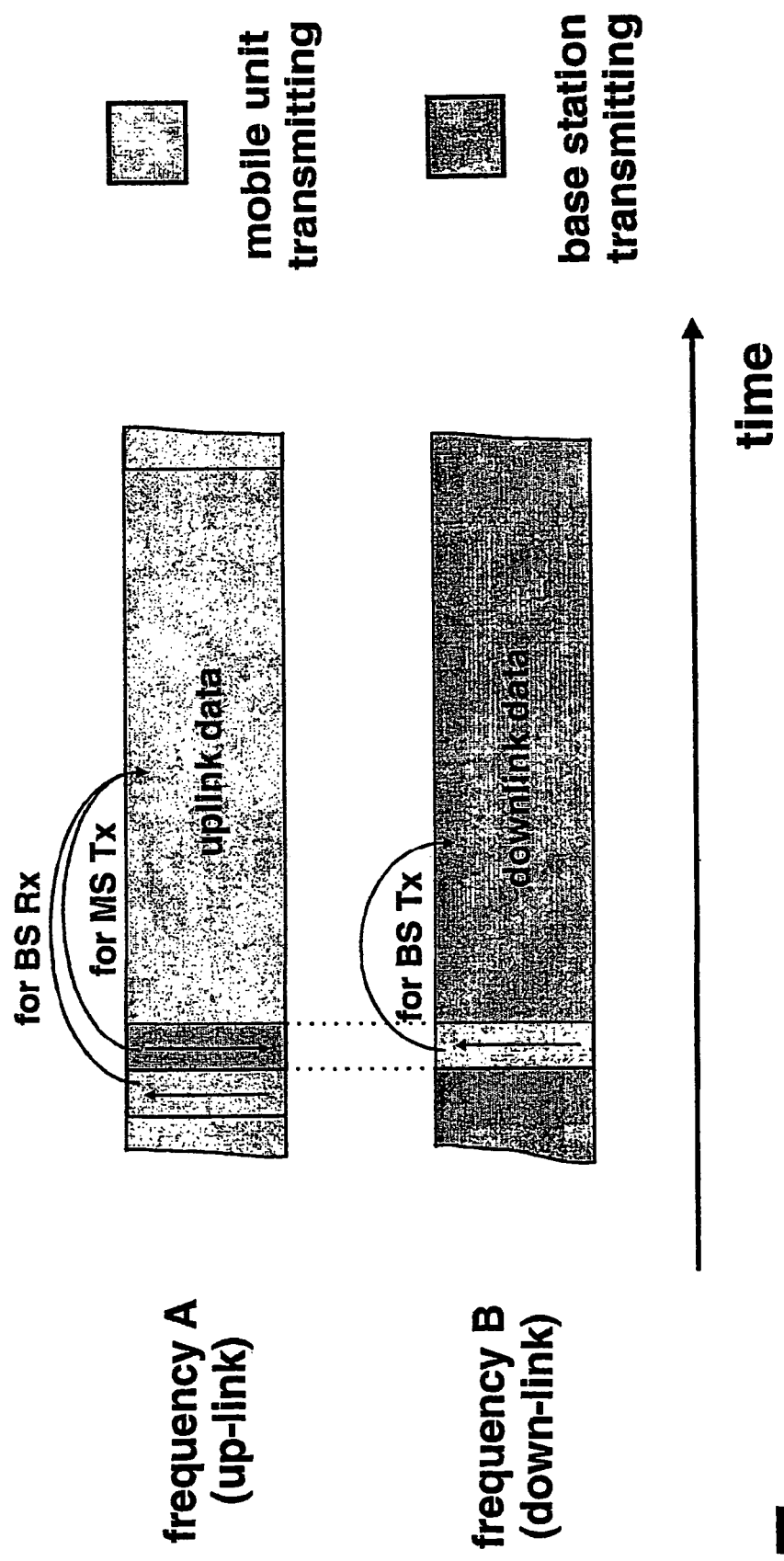
FIG. 6 depicts a MIMO-channel estimation in FDD mode.

The chronological sequence is somewhat more complicated in the frequency duplex (FDD). Different frequencies are simultaneously used in the uplink and downlink transmission directions. It is to be notes that reciprocity is valid only for one and the same carrier frequency. Hence, for the duration of the channel estimation, the mobile and base stations must each be operated at the carrier frequency used for the transmission in the intended direction. Therefore, the local oscillators in the mobile and base stations and the corresponding synchronization unit must be capable of fast switching for operating on both frequencies. A possible time division for both frequencies is shown in FIG. 6. For the uplink transmission direction (uplink data) a channel estimation is required in mobile and base station for frequency A. The mobile station thus initially transmits its pilot sequences so that the base station may set its receiving weights. Thereafter, the base station also transmits its pilot sequences on frequency A and the mobile station sets its transmission weights. In the downlink transmission direction a channel estimation is required only in the base station. Since the transmitters in the mobile station can simultaneously operate on one frequency only, it is advantageous for the mobile station to transmit its pilot sequences on frequency B at the same time in which it executes the channel estimation on frequency A in the downlink direction. For this purpose it is necessary to replace the transmission/receiving selector switches $S_{up/down}$ at the antennae according to FIG. 2 by frequency-selective filters (circulators). The base station executes a channel estimation on frequency B, sets its transmission weights and transmits data in the downlink direction on frequency B.

Figure 7:
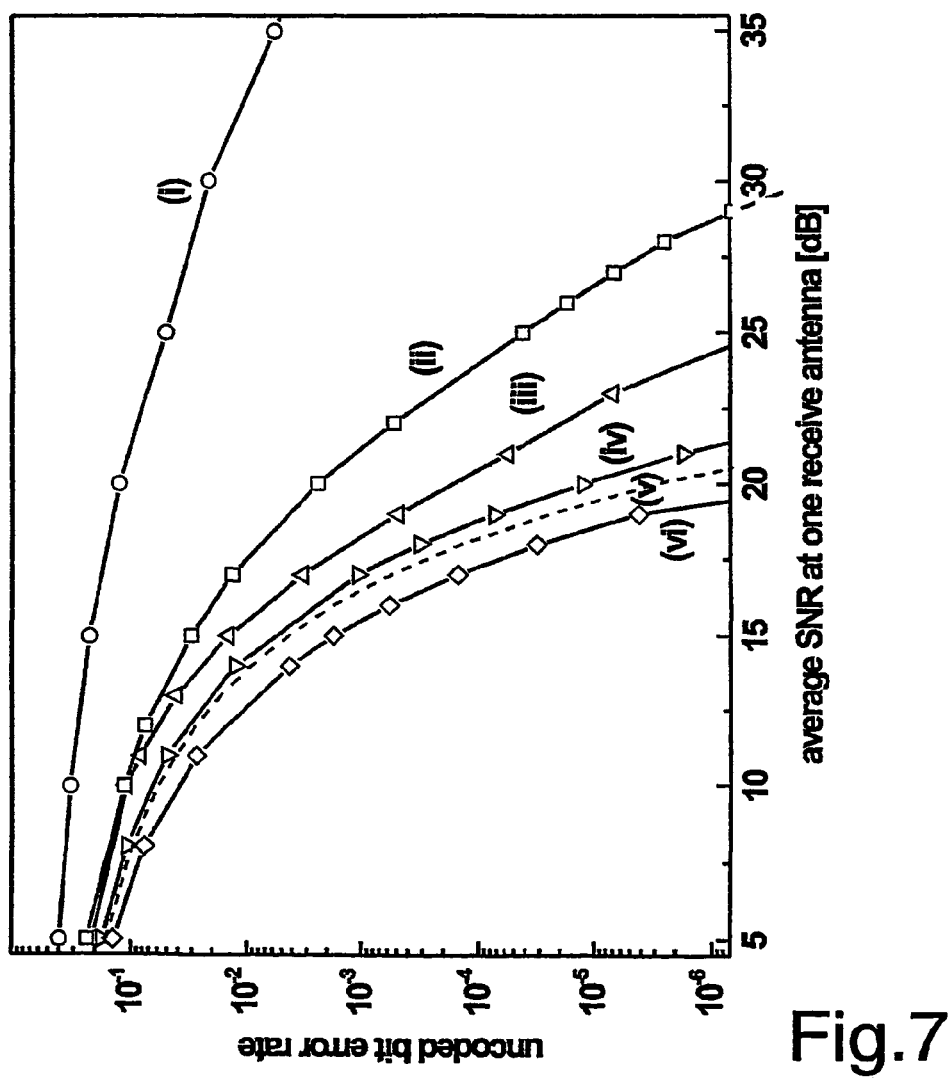
FIG. 7 depicts various curves of bit error rates as a function of the mean signal-to-noise-ratio.

FIG. 7 shows different curves as simulation results of bit error rates as a function of the mean signal-to-noise-ratio at a receiving antenna. The bit error rate of a simulation situation is shown with accidental errors in the channel estimation corresponding to a sequence length of 128 symbols (BPSK-simulation for the pilot sequences, 16-QAM-modulation for the data signals) as a function of the signal-to-noise-ratio at a receiving antenna for the three transmission schemes A, B, and C of FIG. 1. For orientation, V-BLAST as well as a single-channel transmission in a white noise channel (AWGN) have also been shown. It can initially be seen that with pure receiving side signal porocessing (Rx signal processsling only) and an equal number of antennae at both sides (curve I, n=m=10) extremely high bit error rates occur which even with an increase of the signal-to-noise-ratio become only significantly less. In this case, about 10 times more SNR is required in order to reduce the bit error rate by a factor of 10. This can be traced to the effect of the term H−1 in equation (2). At an equanl number of antennae the probability is very high that very small singular values occur as an indication of an almost singular channel matrix H. On the basis of equation (4) noise is raised significantly by the signal processing, and the bit error rate is high. Adding antennae at the receiver (curve ii, n=8, m=12) results in a significant gain (e.g. with 8 transmission and 12 receiving antennae, a transmission power 16 dB lower is required for a bit error rate ov 0.01 than with 10 transmission and receiving antennae each). The V-BLAST method (curve iii, n=8, m=12) reduces the influence of the signal processing on noise more strongly yet by an intelligent recursive detection of the individual data streams. However, the mathematical complexity for this is relatively great.

As expected, the curves with transmission side signal processing (curves iv and vi) in FIG. 7 closely approach the white noise channel (curve v, n=m=1, AWG channel). The insignificant deviation in the downlink transmission direction (curve iv, downlink channel inversion) is a result of the error-laden channel estimation. Apparently, in the uplink transmission direction with transmission and receiving side signal processing (curve vi, n=8, m=12, Tx and Rx signal processing, uplink channel inversion) still lower bit error rates are found as a function of the signal-to-noise ratio at the receiver than in the AWGN channel. At a closer examination this will be found to be arteficial, however. By the multiplication by $VU^H$ the 12-dimensional noise vector n is projected into an 8-dimensional hyper plane. This leads to an initial loss in noise power by the factor 8/12 which corresponds to a gain of 1.5 dB. Howver, in the uplink transmission direction the means receiving power per transmission antenna is lower than it is in the downlink transmission direction because the signals have not been completely decorrelated at the antennae. Looking at the power balance at the receiver for each transmitted bit, the bit error rate at channel inversion is substantially the same in the uplink and downlink transmission directions. Differences arise only because signal processing in the downlink transmission direction is based on a channel estimation at the base station only whereas in the uplink transmission direction two estimations of H independently from each other are used at the base station and of $H^T$ at the mobile station. This does not take into consideration, however, that the transmission power, because of the transmission-side signal processing, is modified as a function of the actual channel matrix H.

A salient comparison between the individual methods is, however, possible only if the bit error rate is represented as a function of the transmission power.

Figure 8:
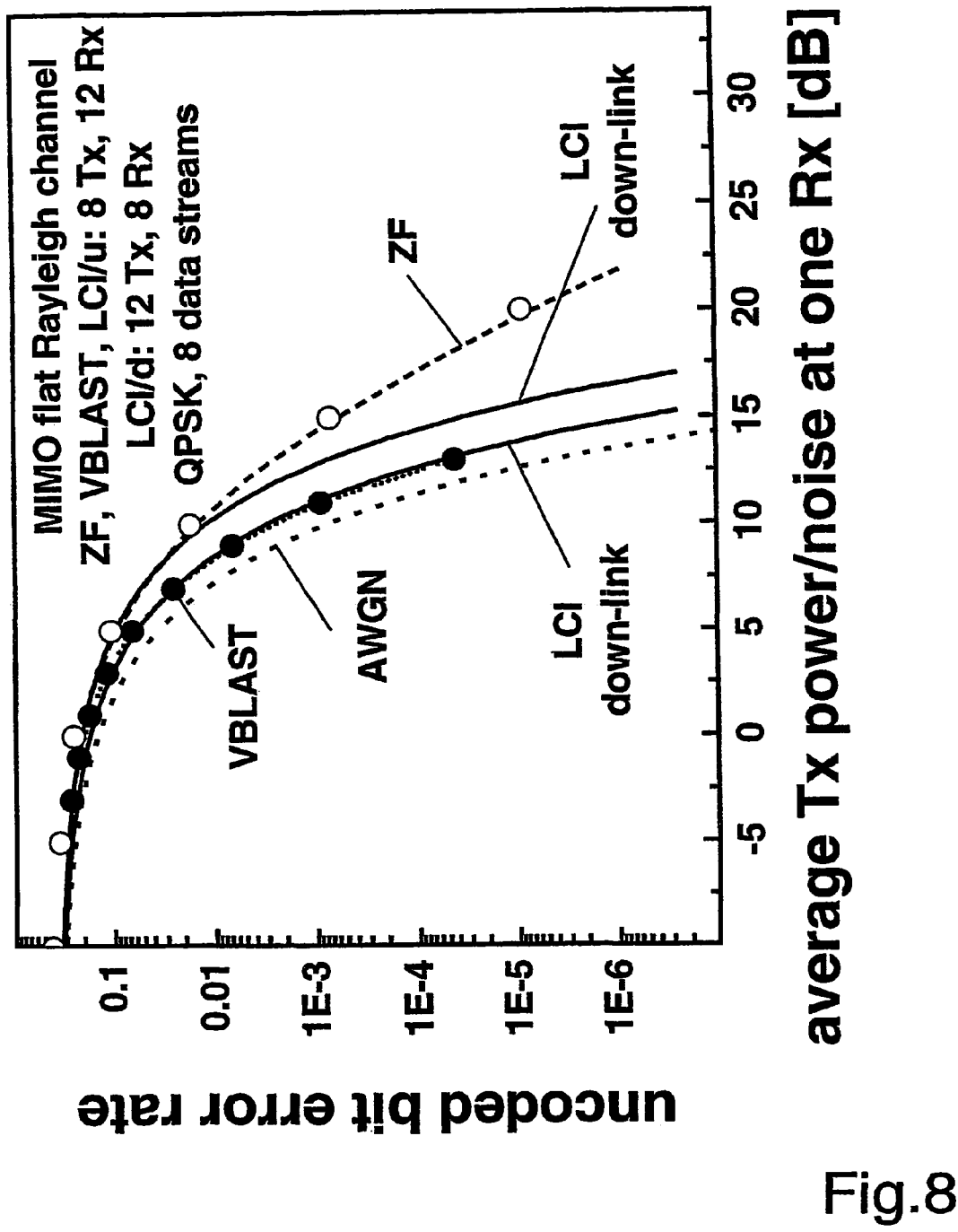
FIG. 8 shows various curves of bit error rates as a function of the overall transmission power.

In FIG. 8, various bit error rates are shown from a simulation (V-BLAST) and from analytical considerations (LCI, AWGN in the single channel) as a function of the total transmission power relative to noise power at a receiver. Since in case of channel inversion the transmission power is statistically distributed, the curves may fairly be shown above the mean transmission power relative to the noise at the received. Building upon [10], [9] shows that the bit arror rate curve with channel inversion is in principle similar to the bit error rate in a single AWGN channel. However, in the downlink transmission direction (down-link) the curve is shifted by the factor n/(m−n) relative to the AWGN curve. In the uplink transmission direction, the above-mentioned effect is added that n data signals are directly detected with m receiving antennae which corresponds to a gain von 10*log(m/n). Consequently, the bit error rate is shifted to the left by this factor. The comparison with other methods operating with receiver-side signal processing becomes possible if it is assumed that the mean path loss of an entry in H is normalized to one. Thus, the known bit error rate curves may be "recycled" with the above normalization of the path loss, because the mean SNR per receiving antenna equals the transmission power divided by the noise at the receiver. For comparison, the mean transmission power is maintained at channel inversion and the AWGN-likje curves are entered with consideration of the above-mentioned shift. It can be seen that in the uplink direction the channel inversion is approximately comparable with V-BLAST, whereas in the downlink direction about 1.7 dB more power is required since there is no post-processing at the receiver. The isotropical noise amplification can be recognized by the substantially steeper descent of the curves for the channel inversion compared to the zero-forcing method.

Figure 9:
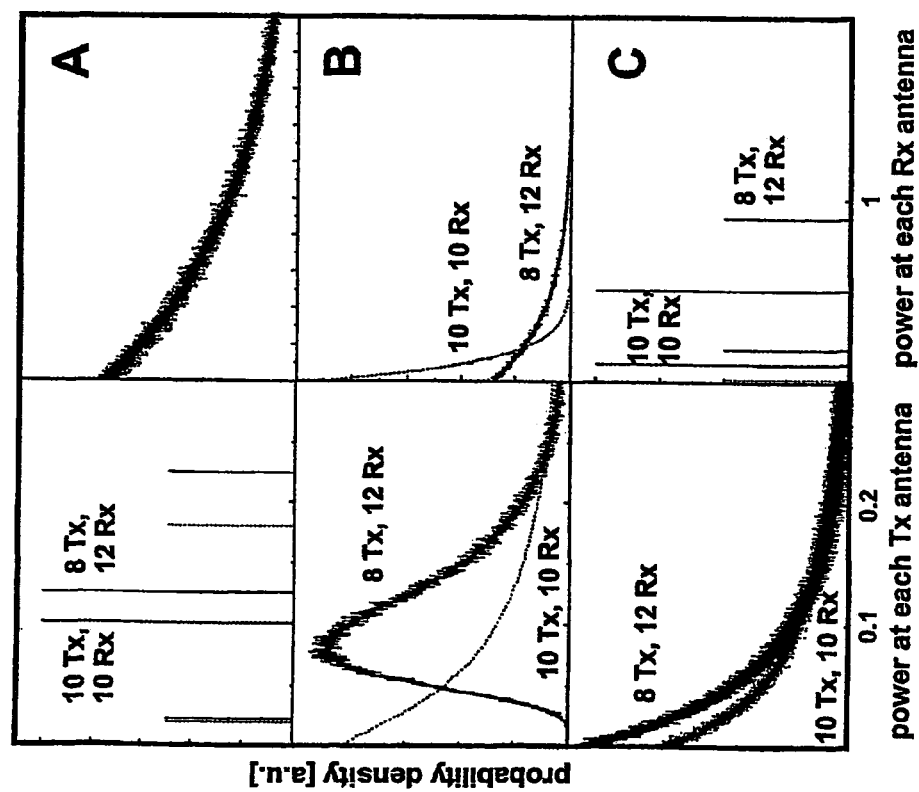
FIG. 9 depicts the power distribution at the transmission and receiving side, from a simulation.

FIG. 9 depicts the transmission and receiver side power distributions (power at each Tx antenna, power at each Rx antenna) for the individual schemes A, B, C of FIG. 1. In scheme A (receiver-side signal processing only) there are three lines at each transmitter which differ in their position only by the number of transmitting antennae. On average, all transmitting antennae radiate identical powe, and the lines result from the possible symbol energies at the selected 16-QAM modulation. Owing to the statistical nature of the transmission channel a broadly dispersed $X^2$-distribution with two degree of freedom are obtained for the power at each receiver. The distribution does not depend upon the number of transmission antennae because the total power of the data streams is normalized and the individual transmission channels are statistically independent.

At channel inversion in the uplink transmission direction (signal processing at transmission and receiving side), a continuous power distribution is found at the transmitter and at the receiver nds upon at. It can be seen that the distribution is localized substantially more strongly around a mean transmission power if more antennae are used at the base station. Hence, smaller dynamics are required which makes possible the use of more inexpensive amplifiers. At the same number of antennae the distribution has a far-extending tail towards high transmission powers. In particular, the statistical mean value does not converge towards a set value if the range of values is enlarged for the transmission power. This renders the dimensioning of the transmission amplifier difficult.

In the downlink transmission direction with channel inversion according to scheme C, at m=n=10 the behavior at the transmitter similar to the uplink transmission direction with channel inversion (scheme B). However, for a distribution with an uneven number of antennae no lower limiting value can now be given, i.e. the transmission dynamics is not limited in a downward direction. In the downlink transmission direction the three distinct lines resulting from the 16-QAM modulation are again present at the receiver, independently of the selection of the free parameters.

On the basis of the explanations of FIG. 1, different MIMO systems may be realized, depending upon their application. In this connection, it is assumed that the uplink transmission station is formed by a locally changeable mobile station and that the downlink transmission station is constituted by a stationary base station. However, no rigid association exists in this context. However, as a precondition it is portulated that more antennae are present at one side of the channel than at the other. The downlink transmission direction is then defined by its pointing from the side of the channel with the excess number of antennae to the side with the lesser number of antennae. The opposite is true for the uplink transmission direction. With the excess number of antennae at the downlink transmission station the downlink transmission direction always is the qualitatively better direction of transmission in the transmission system at purely linear signal processing at the transmitter or receiver. The station which is structured as a mobile or stationary one and which is primarily to transmit or to receive depends entirely upon its given number of antennae. Depending upon an application, the distribution is to be such that the qualitatively high-value downlink transmission direction corresponds to the direction of the high-rate data transmission. For instance, in the reverse case, a video camera may as the mobile unit be equipped with more antennae. It will then transmit in the downlink transmission direction complex data streams to a basis station provided with fewer antennae. The base station will then serve as a simple feed-back, for instance for the local control of the video camera.

MIMO-system I: Scheme B is used for the uplink transmission direction and scheme C is use for the downlink transmission direction of a mobile communications system. This concept allows bidirectional MIMO-transmission with excellent transmission properties and high spped in both directions, and in principle it is suitable for internet as well as intranet access by way of a base station, as well as for an ad hoc operation between two mobile units.

MIMO-System II: Scheme A and scheme C are combined for the uplink transmission direction and Downlink transmission direction, respctively. This make possible a simple and cost-efficient structure of the mobile units which transmit the pilot sequences for the channel estimation and which otherwise consist of several simple transmitters and receivers without signal processing. The entire signal processing required for the transmission takes place at the base station. In the uplink transmission direction the bit error rate will usually be larger which must be compensated by the channel coding. This reduces the data signal rate which is effectively usable in the uplink direction. This concept is particularly suitable for asymmetric data communication, e.g. during internet access. An ad hoc transmission between two mobile stations is not possible, however, because of their lack of signal processing.

MIMO-system III: In concept II, several mobile units may divide among them the total number of antennae so that one mobile unit uses one or more antennae. Overall, the total number of antennae in all mobile stations must be less than the antennae in the base station. All mobile stations transmit and receive on the same frequency. By this concept, the MIMO-system is enabled flexibly to divide its resources among several terminal units which support different applications and each of which is equipped with the hardware required therefor.

REGISTER OF MENTIONED CITATIONS

[1] G. J. Foschini "Layered space-time architecture for wireless communication in a fading environment when using multiple antennas", Bell Labs Technical Journal, 1996 (2), pp. 41-59;

[2] G. D. Golden, C. J. Foschini, R. A. Valenzuela and P. W. Wolniansky "Detection algorithm and initial laboratory results using V-BLAST space-time communication architecture", Electronics Letters, 1999, Vol. 35, No. 1, pp. 14-16;

[3] A. Van Zelst, r. van Nee, G. A. Awater "Turbo-BLAST and its Performance", Proceedings $53^{rd}$ IEEE Vehicular Technology Conference VTC (Spring) May 6-9, 2001, Rhodos, Greece;

[4] C. Z. W. H. Sweatman, J. S. Thompson, B. Mulgrew and P. M. Grant "A comparison of detection algorithms including BLAST for wireless communication using multiple antennas", Proceedings IEEE Symposium on Personal, Indoor and Mobile Radio Communication, Sep. 18-21, 2000, London, pp. 698-703;

[5] E. Telatar "Capacity of Multi-Antenna Gaussian Channels", Europ. Trans. Telecomm., Vol. 10, No. 6 (1999), pp. 585-595;

[6] K. K. Wong, R. D. Murch, K. B. Letaief "MIMO antenna system for frequency-selective fading channels", in. IEEE Int. Symp. On personal, indoor and Mobile Radio Communications, PIMRC 2000, Vol. 2, pp. 1500-1504;

[7] V. Jungnickel, V. Pohl, U. Krueger, C. Von Helmolt, T. Haustein and S. Stanczak "A Radio System With Multi-Element Antennas", Proceedings $53^{rd}$ IEEE Vehicular Technology Conference VTC (Spring), May 6-9, 2001, Rhodos, Greece;

[8] L. J. Greenstein, N. R. Sollenberger "Method and apparatus for the enhancing communication reception at a wireless communication terminal", U.S. Pat. No. 6,131, 016, filed 27 Aug. 1997;

At this point, reference will be made to publications by the inventors after the priority date of the present application and which deal inter alia with the claimed inventive subject:

[9] V. Jungnickel, T. Haustein, E. Jorswieck, C. Von Helmolt "A MIMO WLAN Based on Linear Channel Inversion", IEE Seminar on MIMO Systems, 12 Dec. 2001, London, UK;

[10] E. Jorswieck, G. Wunder, V. Jungnickel, T. Haustein "Inverse Eigenvalue Statistics for Rayleigh and Rician MIMO Channels", IEE Seminar on MIMO Systems, 12 Dec. 2001, London, UK;

[11] T. Haustein, C. Von Helmolt, E. Jorswieck, V. Jungnickel, V. Pohl "Performance of MIMO Systems with channel inversion", IEEE VTC Sprig 2002, Birmingham, Ala., 6-9 May 2002.

What is claimed is:

1. An adaptive signal processing method for a bidirectional wireless transmission of digital data streams in uplink and downlink transmission directions over a MIMO channel with n antennas at one at one side of the channel and m antennae at the other side of the channel and with transmission-side signal preprocessing of the transmission signals x and receiving-side signal postprocessing of the received signals y, both being based upon an estimation of the complex-valued channel matrix, whereby the transmission-side signal preprocessing comprises a multiplication of the data signals to be transmitted by a transmission matrix and the receiving-side postprocessing comprises a multiplication of the received signals with a receiving matrix, the signal postprocessing taking place in the uplink transmission direction exclusively and the transmission and receiving matrix being derived from a linear dissection of the estimated channel matrix H;

at least one antenna being used in the uplink transmission direction (n→m) at the receiving side than at the transmission side and in the downlink transmission direction (m→n) on the transmission side at least one antenna more being used than at the receiving side (n<m), and the estimation of the channel matrix H being determined at a symbol rate of at least 100 ksymbols/s selected in dependence of the channel properties, whereby by making use of the reciprocity of the MIMO-channel at the same transmission frequency in the uplink and downlink transmission and in the absence of common-channel interferences the channel matrix in the downlink transmission direction being derived by transposing the channel matrix from the estimation in the uplink transmission direction, and vice versa.

2. The adaptive signal processing method of claim 1, characterized by the fact that in the uplink transmission direction the transmission matrix for the multiplication by the transmission signals x is defined on the basis of the singular value dissection of the channel matrix H mit n<m, which is given by $$H = U \cdot D \cdot V^H \quad \text{(I)}$$

where U, V=(m×n) column-orthogonal matices (exponent H: hermetitic matrix), D=(n×m)-diagonal matrix with singular values of the channel matrix H, so that modified transmission signals x* are defined by a linear matrix-vector multiplication according to $$x^* = V \cdot D^{-1} \cdot V^H x \text{ or } x^* = V \cdot D^{-1} x \quad \text{(II)}$$

and the the receiving side postprocessing of the received signals y is carried out in the downlink transmission direction by the linear matrix-vector multiplication according to $$x' = V \cdot U^H \cdot y \text{ or } x' = V \cdot U^H \cdot y \quad \text{(III)}$$

for defining reconstructed transmission signals and that in the downlink transmission direction the modified transmission signals x* are defined by the multiplication of the transmission signals x by a generalized inverse of the transposed channel matrix $H^T$ by using the reciprocity of the transmission channel by a linear matrix-vector multiplication according to $$x^* = (H^{-1})^T x. \quad \text{(IV)}$$

3. The adaptive signal processing method of claim 2, characterized by the fact that the generalized inverse is the Moor-Penrose-pseudo inverse.

4. The adaptive signal processing method of claim 1, characterized by the fact that for an estimation of the channel matrix as precisely as possible, special easily generated and recognizable pilot signals are transmitted intermittently or simultaneously superposed to the transmission signals which unambiguously characterize each antenna.

5. The adaptive signal processing method of claim 4, characterized by the fact that the pilot signals are generated from orthogonal sequences, in particular according to Gold or Hadamard, with a length of more than 100 symbols.

6. The adaptive signal processing method of claim 1, characterized by the fact that the wireless transmission is carried out by the time duplex method.

7. The adaptive signal processing of claim 1, characterized by the fact that the transmission is carried out by the frequency duplex method the pilot signals being always transmitted and detected on the same carrier frequency at which the transmission signals are also transmitted.

8. The adaptive signal processing method of claim 1, characterized by the fact that the powers of occurring common-channel interferences are measured after the reconstruction of the transmission signals at the receiving side and that they are regularly transmitted back to the transmission side by a return channel.

9. The adaptive signal processing method of claim 8, characterized by the fact that the power in each data signal path occurring in each MIMO-channel is adjusted to the common-channel disturbance measured at the receiving side after signal postprocessing such that the signal-to-interference-plus-noise power ratio is equal is of the same magnitude in all data signal paths.

10. A MIMO-system with at least an uplink transmission station with n antennas, a downlink transmission station with m antennae, a signal processing unit at least in the downlink transmission station equipped with m antennas as well as with means for determining an estimation of the complex-valued channel matrix for executing the adaptive signal processing method for a bidirectional wireless transmission of digital data streams in uplink and downlink transmission directions over a MIMO-channel with n antennas at the one and m antennas at the other channel side and with transmission-side signal preprocessing of the trabnsmission signals x and a receiving-side signal postprocessing of the received signals y, both of which are based on an estimation of the complex-valued channel matrix, according to claim 1, whereby when using at least one more antenna at the receiving side than at the transmission side in the uplink transmission direction and of at least one more antenna at the transmission side in the downlink transmission direction than at the receiving side (n<m) there is applied a signal processing unit for the linear matrix-vector multiplication in the downlink transmission station for signal preprocessing in the downlink transmission direction and for signal postprocessing in the uplink transmission direction of a signal processing unit for the linear matrix-vector multiplication in the at least one uplink transmission station for signal preprocessing in the uplink transmission direction and a signal processing unit for the linear matrix-vector multiplication in the downlink transmission station for the signal postprocessing in the uplink transmission direction and for the signal preprocessing in the downlink transmission direction.

11. The MIMO-system of claim 10, characterized by the fact that the n antenaae are distributed over several uplink transmission stations which operate without signal preprocessing in the uplink transmission direction and that all n antennas transmit and receive on the same frequency.

12. The MIMO-system of claim 10, characterized by the fact that the uplink transmission station is structured as a locally changeable mobile station and that the downlink transmission station is structured as a stationary base station or vice versa.

* * * * *